Aug. 16, 1927.
H. T. HUTTON
LOCK NUT
Filed Nov. 2, 1926
1,639,407
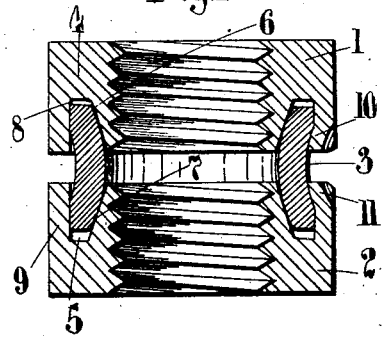
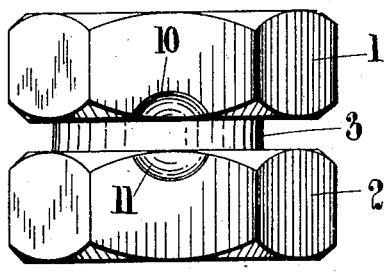
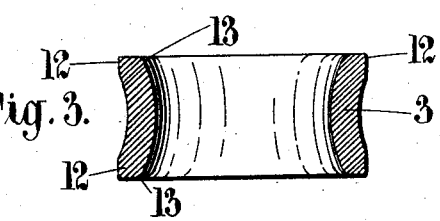
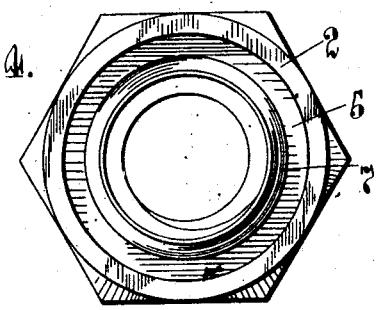
INVENTOR
Henry T. Hutton
BY
Heard, Smith & Jamaux
ATTORNEY Patented Aug. 16, 1927.

1,639,407

UNITED STATES PATENT OFFICE.

HENRY THOMAS HUTTON, OF DONAGHADEE, IRELAND.

LOCK NUT.

Application filed November 2, 1926, Serial No. 145,769, and in Great Britain February 11, 1926.

This invention relates to locknuts of the kind comprising two separate nuts having recesses or grooves concentric with the taphole and a ring to engage in the annular recesses or grooves which are formed in the adjacent surfaces of the nuts.

One of the objects of the present invention is to improve and simplify the construction and assembly of a locknut of this kind in which the locking action is obtained by causing the nuts to grip the bolt tightly all around its periphery as in my prior United States Patent No. 1436805.

Another of the objects is to provide nuts of this character with a greater range of peripheral contraction upon their bolts than was obtainable hitherto ensuring the desired locking action even if the nuts be normally a very slack fit on the bolt.

A further object is to permit the units of the locknut to be readily assembled and then be either coupled permanently together or not as desired. A further object closely allied with this is to permit the units to be assembled if desired as they are placed in position upon the bolt.

Still further objects which are attainable by the present invention will hereinafter appear or be appreciated by those skilled in the art from the following description and the accompanying drawing.

In accordance with the present invention, the dimensions and characteristics of the recesses or grooves and of the ring are such that the ring, without bedding in the bottoms of the recesses or grooves, when the outer nut is screwed down to cause it to approach the other, after the assembled nut including the ring has been screwed on to a bolt, causes the inner wall of the groove or recess in each nut to bind circumferentially upon the bolt all around its periphery. The dimensions and characteristics in accordance with the invention may also be such as to secure the further locking actions mentioned in the specific description hereafter.

The two nuts may be coupled permanently together, but so that they can be rotated relatively to each other by appropriate formation of the annular recesses or grooves and of the ring.

In order that the invention may be fully appreciated the same will now be described with reference to the accompanying drawing, which illustrates by way of example one practical constructional form of nut in accordance therewith. It should be understood however that many modifications falling within the scope of the invention, which is defined in the appended claims, will readily occur to those versed in the art.

In the drawings:—

Fig. 1 is a central section through a preferred form of locknut constructed in accordance with the present invention.

Fig. 2 is a side elevation of the form of nut shown in Fig. 1.

Fig. 3 is a separate sectional view of the ring shown in Fig. 1.

Fig. 4 is a plan of the lower nut of Fig. 1 before the ring is inserted in the groove.

Referring more particularly to the accompanying drawing 1 and 2 are two separate nuts having recesses or grooves 4 and 5 concentric with the taphole and 3 is a ring to engage in said recesses or grooves. It will be noted that the inner walls 6 and 7 of these recesses present a tapered surface whilst the outer walls 8 and 9 present a surface substantially parallel with the axis of the nut, except where they are upset as indicated at 10 and 11. This upsetting may be effected by punching inwards the outer walls 8 and 9 at appropriate intervals and has the effect of coupling the two nuts 1 and 2 permanently together but so that they can be rotated relatively to each other. In this connection it will be noted that the ring is flared outwards at the ends and is generally of curved form as seen in section in Fig. 3 but has flat outer walls 12 adjacent the ends so that when the outer walls 8 and 9 of the nuts are upset the ring will be gripped in both nuts 1 and 2, and the complete locknut formed.

It should also be noted that the inner wall of the ring 3 has been eased off at each end at 13 which has a material effect on the successful operation of the locknut. The amount of the bevel should preferably be such that the inner diameter at the ends of the ring 3 is the same as that of the bases of the inner walls 6 and 7, the effect being to avoid bursting or overloading of the ring. Furthermore the curved formation of the ring 3 lends it a certain amount of elasticity which is also desirable.

The two nuts 1 and 2 thus assembled can be manipulated after the manner of an ordinary nut in screwing it on to a bolt, both nuts being rotated in unison until the inner nut, for example the nut 2, is screwed up tight. Thereupon the outer or locking nut 1 can be rotated a little further to effect locking. Such further rotation, owing to the appropriate dimensions and characteristics of the recesses or grooves 4 and 5 and of the ring 3, bends or presses inwards the inner walls 6 and 7 of the grooves, which may be comparatively thin, and thus causes both nuts to grip the bolt firmly about its whole periphery, the grip being preferably of a somewhat elastic nature. In connection with the dimensions and characteristics above mentioned it will be seen from Fig. 1 that whilst the ring 3 is in contact with the inner walls 6 and 7 there is sufficient space between the ends of the ring 3 and the bottoms of the grooves to permit a substantial bending or pressing inwards of the inner walls 6 and 7 by the ring before the ring beds against the bottoms of the grooves.

A further or second locking action may be obtained when the inner nut 2 is bedded on the work and the outer nut 1 further rotated; this may cause the lips of the ring 3 to expand and to bed in the grooves particularly against the outer walls 8 and 9 thereof, and the further pressure is accompanied by increased contraction on the bolt.

Another or third action may result as follows:—

If the outer nut is further rotated, the expansion of the ring may cause the outer walls 8 and 9 of the nuts to expand and the ring eventually to bed on the bottoms of the grooves 4 and 5. This is a condition of great lock.

In some cases it may be possible and desirable to obtain a fourth action by still further rotation of the outer nut. The ring 3 being now bedded in the recesses 4 and 5, the end pressure caused by such further rotation may result in a contraction of the middle portions of the ring, thus forcing the inner walls of the recesses to grip the bolt still more tightly. This is the condition of maximum lock.

Incidentally it may be found that the outer walls 8 and 9 of the grooves are expanded slightly if the outer nut 1 is rotated with much force after the ring has bedded in the grooves.

The construction is preferably such that in addition to the actual locking of the two nuts 1 and 2 upon the bolt, a frictional lock tending to prevent relative rotation of the two nuts is obtained owing to engagement between the walls and/or bottoms of the recesses or grooves 4 and 5 and the ring 3.

It will be understood that the two nuts 1 and 2 may be substantially identical in formation as illustrated and described which not only keeps down the cost of manufacture but also permits the assembled locknut to be screwed on to a bolt with either of the nuts 1 or 2 serving as the inner nut without affecting the locking action in the least, which is of course a great advantage in use.

I claim:—

1. A locknut comprising two separate nuts having recesses at their adjacent ends concentric with the taphole, the walls of said recesses being of gradually decreasing diameter toward the adjacent ends of the nuts, and a ring engaging said walls, the ring being of generally curved form in cross section, and the diameters of the walls of the recesses and the resistance thereof to distortion being such that the ring cannot normally bed on the bottoms of the recesses, so that upon screwing the nuts together upon a bolt the end threads of the nut are pressed circumferentially into the threads of the bolt thus securing a locking effect.

2. A locknut constructed in accordance with claim 1 in which the recess in each nut is in the form of a groove the inner wall of which gradually decreases in diameter toward the end of the nut whereas the outer wall does not so decrease in diameter, thus permitting the groove to be formed easily and the ring to be inserted readily.

3. A locknut constructed in accordance with claim 1 in which the ring is of generally curved form in cross section, said ring having flat outer walls adjacent the ends.

4. A locknut constructed in accordance with claim 1, in which the ring is of generally curved form in cross section and has flat outer walls adjacent the ends, the inner wall of said ring being eased off at each end.

5. A locknut comprising two separate nuts formed with annular grooves in their adjacent ends concentric with the taphole, the inner walls of said grooves being of gradually decreasing diameter toward the said ends of the nuts and the outer walls substantially parallel with the axis of said nuts, and a ring of substantially curved form in cross section inserted in said grooves the outer walls of the grooves being pressed inwards at intervals after insertion of the ring, thus coupling the said nuts permanently together but so that they can be rotated relatively to each other.

In testimony whereof, I have signed this specification.

HENRY THOMAS HUTTON.